April 7, 1953     I. L. LANGVAND     2,633,831
BOILER Filed March 12, 1946     7 Sheets-Sheet 1

Fig.1

INVENTOR
Ivar L. Langvand
BY J.P. Moran
ATTORNEY

April 7, 1953     I. L. LANGVAND     2,633,831
BOILER Filed March 12, 1946     7 Sheets-Sheet 2

Fig. 2

INVENTOR
Ivar L. Langvand
BY J. P. Moran
ATTORNEY

INVENTOR
Ivar L. Langvand
BY

ATTORNEY

April 7, 1953          I. L. LANGVAND          2,633,831

BOILER

Filed March 12, 1946          7 Sheets-Sheet 4

INVENTOR
Ivar L. Langvand
BY
ATTORNEY

April 7, 1953            I. L. LANGVAND            2,633,831
BOILER Filed March 12, 1946            7 Sheets-Sheet 5

INVENTOR
Ivar L. Langvand
BY
ATTORNEY

INVENTOR
Ivar L. Langvand

Patented Apr. 7, 1953

2,633,831

UNITED STATES PATENT OFFICE 2,633,831

BOILER

Ivar L. Langvand, Barberton, Ohio, assignor to The Babcock & Wilcox Company, Rockleigh, N. J., a corporation of New Jersey Application March 12, 1946, Serial No. 653,843

2 Claims. (Cl. 122—336)

The invention herein disclosed relates to the construction and operation of vapor generating apparatus of the integral furnace type, that is, a steam boiler or other vapor generating unit having a combustion chamber laterally adjoining convection heated boiler surface.

My invention relates especially to boilers of the character described wherein a space containing boiler tubes is partitioned from the combustion chamber and communication therebetween provided at one end. The boiler tubes are suitably arranged in a bank extending between opposite walls of the setting and the heating gases which enter from the combustion chamber adjacent one of the walls are usually directed horizontally in one or more heating gas passes across the boiler tubes for discharge from the setting adjacent the opposite wall.

An important object of my invention is the provision of a boiler of the above mentioned type affording higher vapor generating capacity than heretofore attainable for a given area of floor space occupied.

Another object of my invention is the provision of an associated combustion chamber suitably constructed for the use of various kinds of fuels, liquid, solid or gaseous, including especially a finely divided solid fuel such as pulverized coal.

An additional object of my invention is the provision of a vertically extended combustion chamber affording enlarged furnace volume, and having fluid cooled walls formed by tightly spaced fluid carrying tubes affording increased heat absorption surface.

A further object is the provision of gas flow passes across convection heated boiler surface affording low draft loss and providing improved distribution of horizontal heating gas flow over substantially the entire available heating surface of an upright bank of tubes.

Other objects relate to the arrangement of gas passes and the discharge of gases therefrom; the trapping of soot from gases flowing through the passes; the superheating of vapor in one of the passes; the desuperheating of vapor in apparatus submerged within a boiler drum beneath certain passes; and the provision of openings between tightly spaced wall tubes, together with the provision of suitable closure means for such openings.

The various features of novelty which characterize my invention are pointed out with particularity in the claims annexed to and forming a part of this specification. For a better understanding of the invention, its operating advantages and specific objects attained by its use, reference should be had to the accompanying drawings and descriptive matter in which I have illustrated and described preferred embodiments of my invention.

Figure 1:
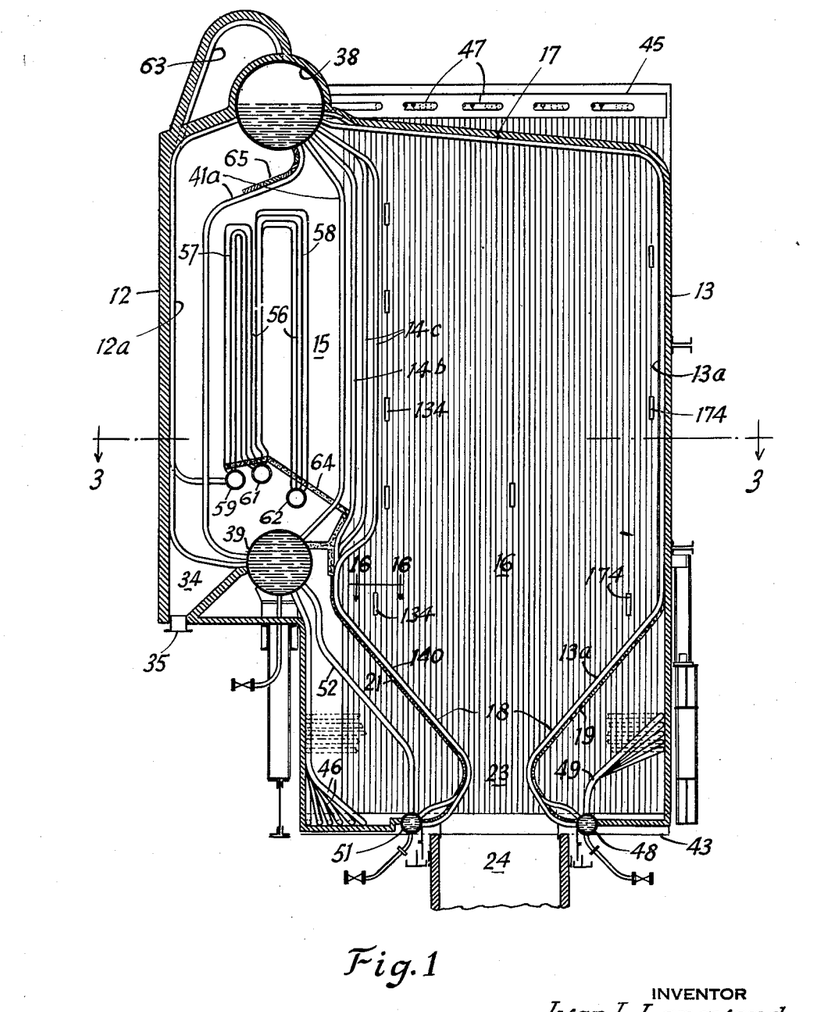
Figs. 1 and 2 are sectional front elevations, in parallel planes, of a boiler embodying various features of my invention.
Figure 2:
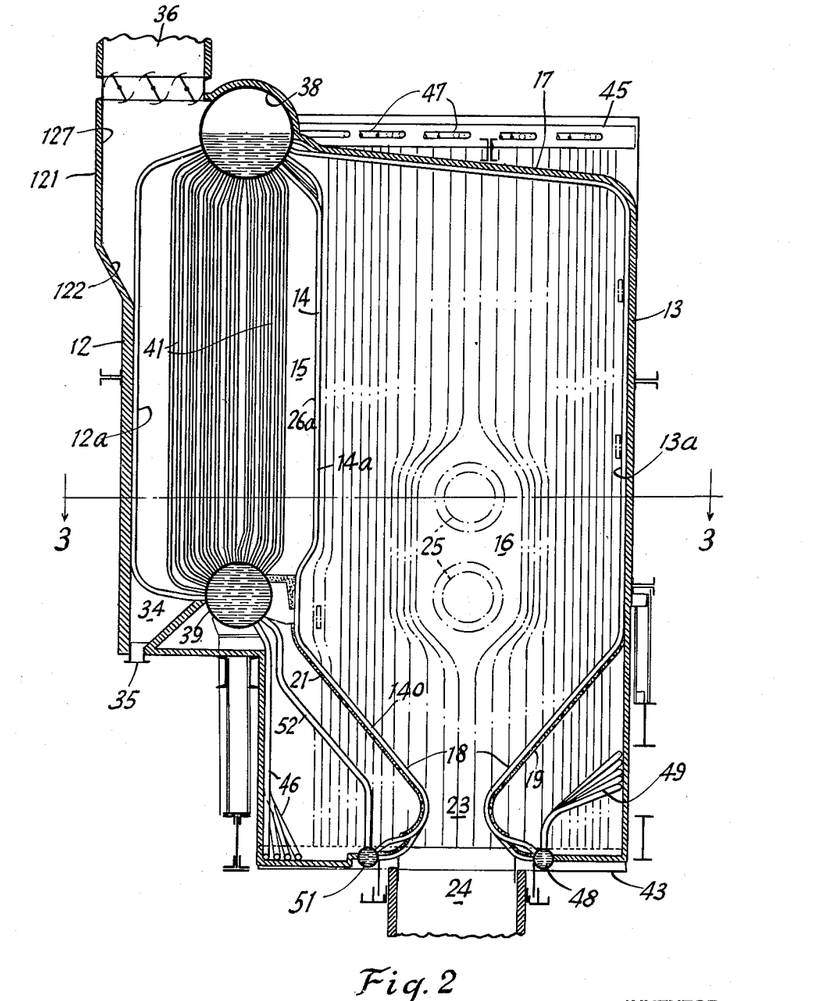
Figure 3:
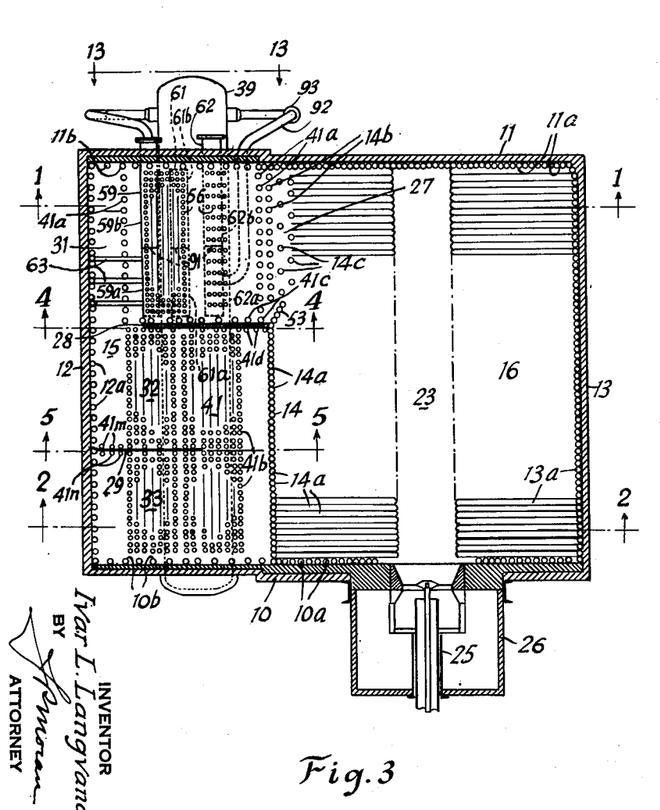
Fig. 3 is a section, in plan, of the boiler illustrated in Figs. 1 and 2, taken along line 3—3 in each.

In more detail, Figs. 1, 2 and 3 illustrate an embodiment of my invention in the form of an integral furnace boiler having a setting of substantially rectangular horizontal cross section generally defined by upright front and rear walls 10 and 11, respectively, together with opposing upright side walls 12 and 13, the space within the setting being partitioned as by an upright interior partition wall 14 to provide a boiler tube space 15 laterally adjoining the upper portion of a furnace or combustion chamber 16, the side wall 13 being extended over the combustion chamber to form an upper enclosing wall or roof 17. The combustion chamber extends downwardly below the level of boiler space 15 where its lower end is suitably formed as an ash hopper 18 having inclined side wall or floor portions 19 and 21 converging downwardly toward a rectangular throat passage 23 for discharging ash or other solids into an ash pit 24 positioned therebelow. In the construction disclosed, the inclined hopper walls 19 and 21 are essentially lower extensions of the upright setting wall 13 and partition wall 14 respectively which thus constitute the side walls of combustion chamber 16. One or more burners 25 of a type suitable for the fuel to be burned are installed in association with the front wall 10, for example, to provide a source of heating gases. Air for combustion is supplied to the burners through a windbox 26 to which air under pressure is supplied by the customary forced draft fan.

The partition wall 14 extends from the front wall 10 to a location spaced from the rear wall 11 whereby a passage 27 is provided for heating gases flowing from the combustion chamber 16 into the boiler space 15. Transverse baffles 28 and 29 extending partially across boiler space 15 provide serially connected gas passes 31, 32, and 33 through which a substantially horizontal flow of heating gases is maintained from the combustion chamber 16. A soot hopper 34 is formed at the bottom of boiler space 15 adjacent the side wall 12, a discharge opening 35 being provided below each of the gas passes 31, 32, and 33, the lower end of baffle 29 extending across soot hopper 34 to prevent the bypassing of heating gases around tubes in passes 32 and 33. If desired, a separate wall member may be utilized for the same purpose. The spent gases are discharged from the setting through a breeching 121 and dampered outlet 36, suitably from an upper portion of the final pass 33 as indicated in Fig. 2, for example, the breeching having outwardly displaced wall portions 122 and 127 to provide adequate gas discharge area past boiler drum 38. Outlet 36 is connected to the usual stack or other draft apparatus to induce a flow of heating gases from the furnace and through the passes of the boiler.

The boiler includes upper and lower drums 38 and 39, respectively, having their longitudinal axes in a common substantially vertical plane, the drums being connected by a bank of upright boiler tubes 41 disposed within the boiler tube space 15 between front and rear walls 10 and 11. In the embodiment disclosed, the boiler bank tubes 41 have the major portions of their lengths straight and vertically disposed with their upper and lower end portions bent to enter the respective drum walls radially, such tubes being suitably arranged in parallel rows extending longitudinally of drums 38 and 39, preferably with the tubes 41a in the first pass 31 larger in diameter and more widely spaced than tubes 41b in either of the succeeding passes 32 and 33. The tubes of bank 41 include tubes contiguous to both sides of each baffle 28 and 29, such tubes serving to cool and support the baffles and comprising tubes 41c and 41d in transverse rows along opposite sides of baffle 28, and tubes 41m and 41n in other transverse rows along opposite sides of baffle 29.

Each of the setting walls 10, 11, 12, 13, and partition wall 14 comprises at least one row of fluid cooling tubes 10a, 11a, 12a, 13a, and 140, respectively, suitably connected to drums 38 and 39 to provide natural circulation flow paths in parallel with the boiler bank 41. In the front and rear walls 10 and 11, the tubes 10a or 11a, as the case may be, have their lower ends connected to a header 43 and their upper ends to a header 45, each lower header 43 being connected to the lower boiler drum 39 through make-up connections 46, and each upper header 45 being connected to the upper boiler drum 38 through riser connections 47. Other tubes 10b and 11b adjoining portions of front and rear walls 10 and 11, and tubes 12a adjoining side wall 12, have their upper and lower ends connected to drums 38 and 39 as in the case of boiler tubes 41.

In wall 13 which defines the outer boundary of combustion chamber 16, the tubes 13a have their lower ends connected to a side wall header 48 having make-up connections 49 from the lower boiler drum 39, the upper ends of tubes 13a being connected to the upper boiler drum 38 in rows circumferentially spaced from the upper end connections of boiler bank tubes 41.

It will be noted from Fig. 3 that the tubes associated with walls 11 and 13 in certain higher temperature zones are more closely spaced than those associated with walls 10 and 12 in lower temperature zones. Thus in order to provide the maximum cooling effect and at the same time attain maximum heat absorbing capacity, the tubes 11a and 13a are arranged in their respective rows at center-to-center spacings substantially equal to their diameters, thereby providing an essentially closed wall structure.

In wall 14 which defines the inner boundary of combustion chamber 16, the tubes 140 have their lower ends connected to a side wall header 51 to which make-up connections 52 are provided from the lower boiler drum 39, the upper ends of tubes 140 being connected to the upper boiler drum 38 in rows intermediate the upper end connections of tubes 41 and 13a. In the inclined hopper wall 21 the tubes 140 are arranged in a single row at center-to-center spacings substantially equal to their diameters as in the case of rear wall tubes 11a and side wall tubes 13a. Above hopper wall 21, the tubes 140 may be regarded as comprising three groups 14a, 14b, and 14c, as determined by their form and arrangement. In group 14a the tubes are extended upwardly in a single row to form the upper portion of wall 14 which partitions the boiler space 15 from the furnace chamber 16, the spacing of tubes 14a being the same as tubes 140 in hopper wall 21, and certain tubes 14a being bent out from the longitudinal plane of the partition to form a relatively narrow extension baffle 53 to further the redistribution of heating gases before entering the first pass 31. In groups 14b and 14c the tubes extend upwardly across the entrance to gas pass 31 in rows paralleling the rows of boiler tubes 41, the tubes 14b being arranged in a single row at center-to-center spacings of twice their diameters, while tubes 14c are arranged in two rows, and staggered, at center-to-center spacings of four times their diameters in each row, thereby forming a slag screen.

A superheater 56 is positioned in the first pass 31 rearwardly of the slag screen and between spaced rows of boiler tubes 41a, the superheater comprising upwardly extending loops formed as U-tubes 57 and 58 connected to inlet, intermediate, and outlet headers 59, 61, and 62, the inlet connections 63 for conducting steam or other vapor to inlet header 59 extending downwardly along side wall 12 between spaced tubes 12a. A baffle 64 extends upwardly from drum 39 and across the superheater loops to protect headers 59, 61, 62 from the hot gases entering the first pass 31, the baffle 64 also defining the lower boundary of the passage available for gas flow over the superheater tubes. A baffle 65 supported on a row of boiler tubes 41a extends downwardly from upper drum 38 to partially close off the space between the drum and the upper ends of the superheater loops, thereby confining heating gas flow substantially to the space occupied by superheater tubes and promoting greater uniformity of gas distribution thereover. Baffle 65 is suitably made in removable sections to permit adjustment of the space through which gases may bypass superheater surface.

Figure 4:
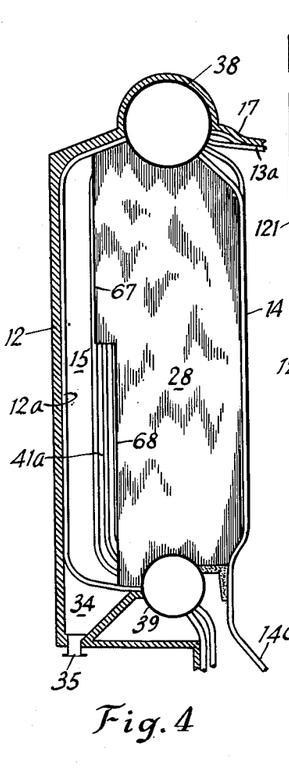
Figs. 4 and 5 are fragmentary sectional elevations showing certain baffle arrangements taken along lines 4—4 and 5—5 respectively of Fig. 3.
Figure 5:
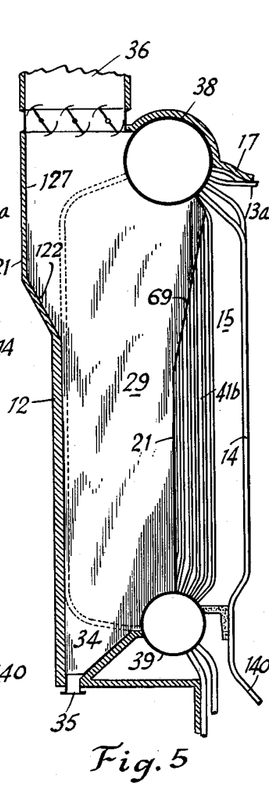

The transverse baffles 28 and 29 between passes 31, 32, 33, are preferably formed, as in Figs. 4 and 5 for example, to effect substantial equalization of heating gas flow across boiler tubes 41 throughout the height of the bank, each baffle being of varying width from bottom to top so that vertically elongated openings between adjacent passes have greater flow resistance or restriction in the upper portions thereof as compared with the lower portions, whereby the flow of heating gases will be more uniformly distributed throughout the vertical height of the tube bank, the varying flow restriction compensating for the stack effect and the location of the gas outlet from the upper portion of the last pass 33 at a point removed from the gas inlet.

Baffle 28 at the entrance to second pass 32 is of maximum width throughout its upper portion having an edge 67 vertical and parallel to the adjacent side wall 12, the lower portion of the baffle being narrower with an edge 68 also vertical and parallel to side wall 12. Baffle 29 at the entrance to third pass 33 is similarly of maximum width throughout its upper portion having an upper edge 69 inclined downwardly away from the adjacent partition wall 14, the lower portion of the baffle being narrower with an edge 71 vertical and parallel to partition wall 14.

Figure 6:
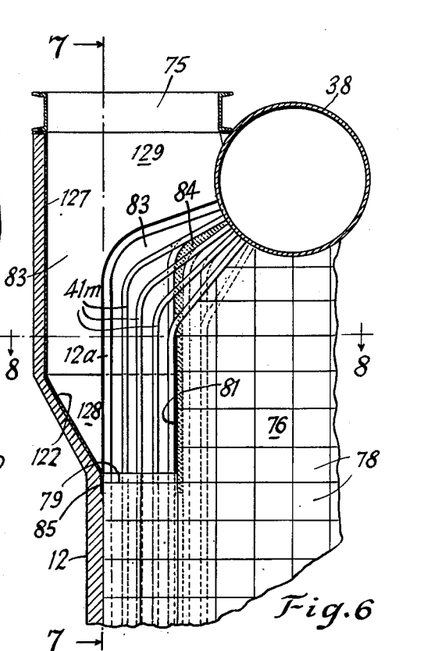
Figs. 6, 7 and 8 are fragmentary front, side and plan sections, respectively, showing a modified baffle arrangement.
Figure 7:
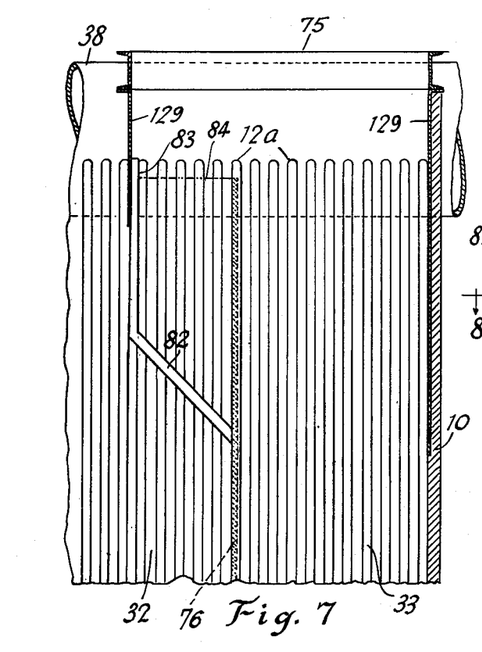
Figure 8:
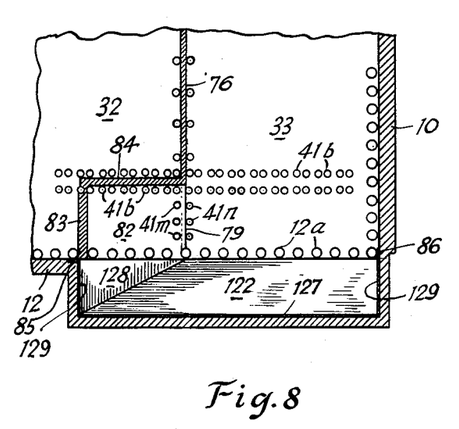

Figs. 6, 7 and 8 illustrate a modified interpass baffle arrangement whereby an increased area of gas outlet 75 is provided for gases leaving the setting. In this arrangement the rectangular outlet 75 is of a longitudinal dimension greater than the width of pass 33 and thus overlies a portion of the preceding pass 32. The cross baffle 76 between passes 32 and 33 suitably comprises tile 78 laid up between adjacent rows of tubes 41m and 41n and providing an upper baffle portion of notched formation as defined by horizontal and vertical edges 79 and 81 respectively. An inclined baffle 82, suitably of monolithic refractory construction, extends upwardly from the upper horizontal baffle edge 79 to the lower end of monolithic vertical baffle 83 which is joined to outlet 75 by the vertical breeching end wall 129, the baffle 83 terminating in an outer edge conforming to the curvature of adjacent tubes 12a between which it is disposed. Baffle 82 engages certain tubes 12a and 41b along opposite parallel margins and is extended laterally by the upwardly inclined breeching wall 128 which terminates at its upper end in the vertical breeching end wall 129. The gas discharge passage is further defined by a monolithic baffle 84 extending downwardly from drum 38 between longitudinal rows of boiler tubes 41b and joined to or abutting the ends of baffles 76, 82 and 83.

Breeching 121 is formed with a marginal flange 85 by which it is secured to successive tubes 12a along side wall 12, the flange 85 extending horizontally and rearwardly from front wall 10 at a level adjacent the horizontal notch edge 79, and continuing upwardly along the outer margin of inclined baffle 82, then along a tube 12a adjacent the outer face of baffle 83 to a point adjacent drum 38, the end wall 129 adjacent wall 10 being similarly secured along its margin 86 to a tube 12a at the end of the row. End walls 129 may also be suitably secured to drum 38. Although the specific manner of attachment to tubes 12a is not indicated, it will be understood that various known holding means may be employed including, for example, threaded studs and nuts, in which case the studs would be secured to the tubes.

Figure 9:
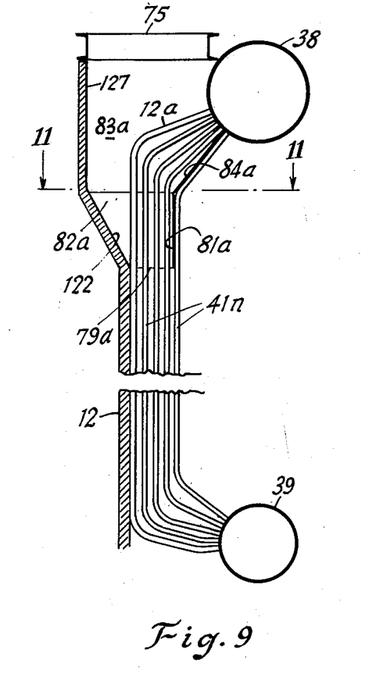
Figs. 9, 10 and 11 are fragmentary front, side and plan sections, respectively, showing another modified baffle arrangement.
Figure 10:
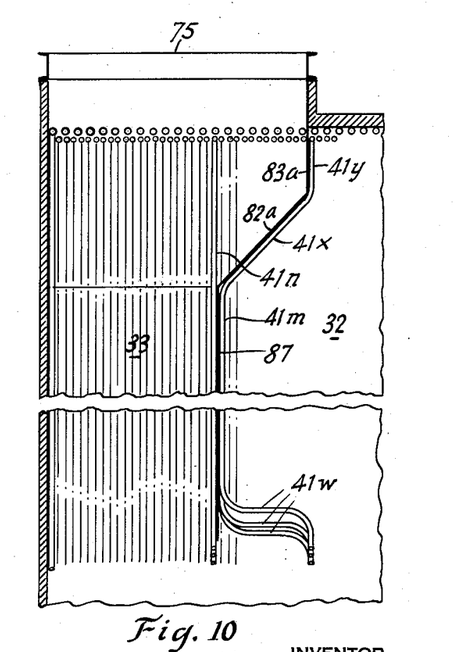
Figure 11:
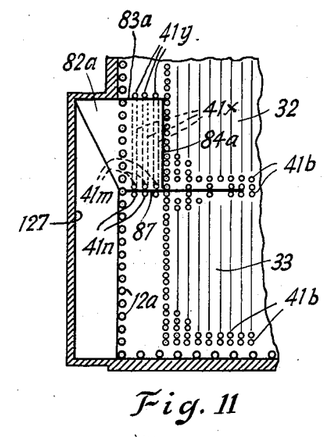

Figs. 9–12 show two additional modified baffle arrangements providing increased gas discharge area from the final pass 33, in each form the rectangular gas outlet 75 overlying a portion of pass 32 as in the previously described modification. In Figs. 9–11, the interpass baffle 87 is suitably formed of metal plate notched in the manner of tile baffle 76 to provide a horizontal upper edge 79a and an adjoining vertical edge 81a, a metal baffle plate or baffle portion 82a inclining upwardly from edge 79a to the lower edge of a vertical baffle plate or portion 83a which connects with an end wall of outlet 75. A metal baffle plate 84a extends downwardly from drum 38 to form the inner wall of the gas discharge passage, the plate 84a conforming to the contour of the outer longitudinal row of boiler tubes 41b and being supported and cooled thereby. The inclined portion 82a of baffle 87, and its vertical portion 83a, are supported and cooled by the correspondingly inclined and vertical portions 41x and 41y of the adjacent row of boiler tubes 41m, three such supporting and cooling tubes being indicated in Fig. 11. The lower portion of baffle 87 is maintained vertical as indicated in Fig. 10 from which it will also be noted that the lower portions 41w of tubes 41m are reversely bent clear of baffle 87 to enter lower drum 39 in vertical planar alignment with their upper end con- end connections to drum 39.

Figure 12:
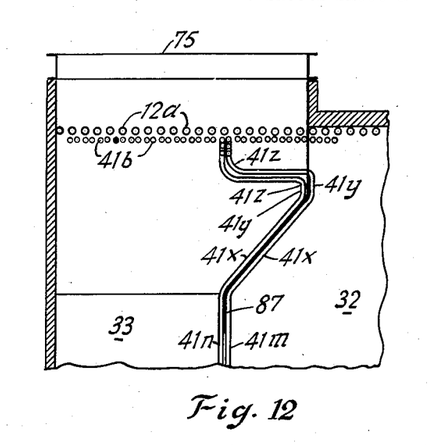
Fig. 12 is a fragmentary side section, similar to Fig. 10 showing a further modified baffle arrangement.
Figures 13, 14:
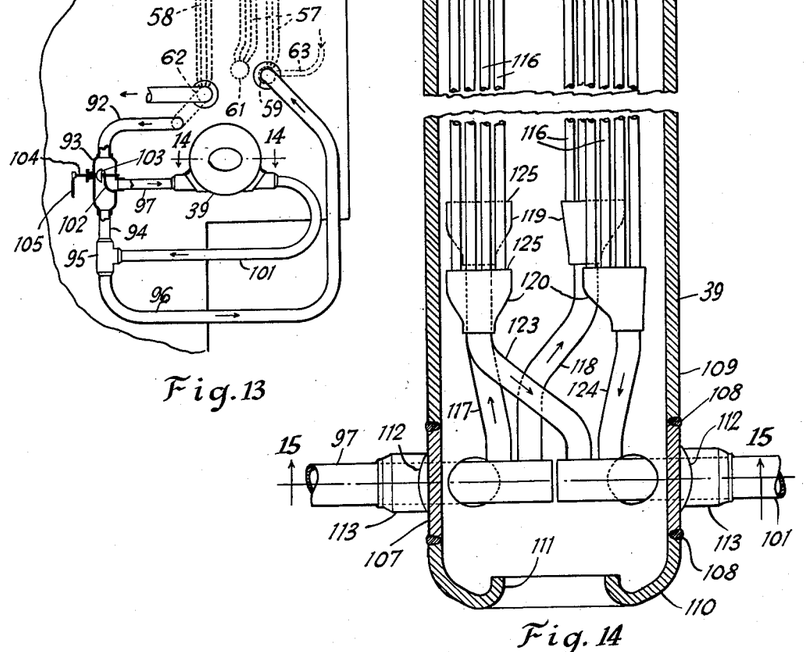
Fig. 13 is a fragmentary rear elevation, partly broken away, illustrating connections between a superheater and an attemperator, both associated with the boiler.
Fig. 14 is a longitudinal section through the lower boiler drum, taken along line 14—14 of Fig. 13, showing the attemperator.
Figure 15:
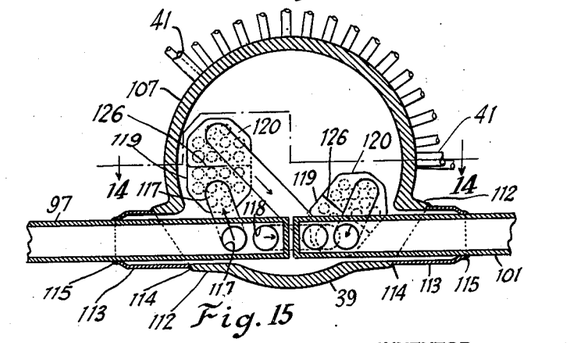
Fig. 15 is a transverse section, taken along line 15—15 of Fig. 14.

In the arrangement illustrated in Fig. 12, with baffle 87 formed as in Fig. 10, tubes 41m and 41n at opposite sides are reversely bent to conform to the upper inclined and vertical baffle portions 82a and 83a, and are additionally bent as at 41z to return them to their original vertical planes for connection to upper boiler drum 38 in vertical planar alignment with their lower and connections to drum 39.

The superheater 56 in first pass 31 is of the multipass type having each of its headers 59, 61 and 62 transversely divided as by a partition wall 91, as indicated in Fig. 3, to provide primary sections 59a, 61a, 62a adjacent baffle 28, and secondary sections 59b, 61b, 62b, adjacent rear wall 11. Vapor delivered to primary inlet section 59a flows through the associated loops 57 into primary intermediate section 61a and thence through associated loops 58 into primary outlet section 62a, thus completing a primary stage of superheating.

The initially superheated vapor is discharged from the bottom of the last named section through pipe 92 to regulating valve 93 from which a portion of the vapor may be directed through pipe 94, T 95, and pipe 96 to the secondary inlet section 59b for further superheating. Any remaining portion of the vapor from valve 93 is directed through pipe 97 to an attemperator 98 submerged within lower boiler drum 39. Desuperheated vapor is discharged from the attemperator through pipe 101 leading to T 95 in which desuperheated and initially superheated vapor portions are mingled for combined flow through pipe 96 into the end of secondary inlet section 59b.

Regulating valve 93 as shown is formed with a diaphragm 102 diametrically disposed above the level of pipe connection 97 and curved downwardly into contact with the housing below connection 97. A damper 103 generally of the butterfly type is mounted adjacent the upper end of diaphragm 102 with its spindle 104 at right angles thereto, the damper comprising semi-circular blades at right angles to each other at opposite sides of the diaphragm, the spindle having a handle 105 secured thereto and being supported in bearings at opposite ends, both bearings having suitable structures associated therewith to prevent leakage of vapor.

The attemperator inlet and outlet pipes 97 and 101 enter drum 39 through a specially formed drum section 107 which is circumferentially welded along opposite edges as at 108 to the main drum length 109 and drum head 110, respectively, the insert section 107 having oppositely disposed aligned integral push-out portions 112 offset from the central longitudinal drum axis and of the required internal cross section to provide clearances about pipes 97 and 101. Relatively thin metal cylinders or sleeves 113 are peripherally welded at their inner ends to the respective pushouts 112, and at their outer ends 115 to the respective pipes 97 and 101, each sleeve at its inner end having an internal circular cross section substantially equal to that of a push-out 112, and at its outer end, an internal circular cross section corresponding to the outer cross section of a pipe 97 or 101. By this construction, fluid tight joints are maintained between pipes 97 and 101 and drum 39 under the severe conditions imposed during service, due for example to temperature differentials between the superheated vapor and the boiler liquid, and the wide variations in vapor temperatures which may accompany the desuperheating process.

The attemperator 98 comprises circumferentially spaced bundles of horizontally disposed U-tubes 116 connected in parallel between inlet pipe 97 and outlet pipe 101, the tube bundles 116 extending, for example, beneath the first and second gas passes 31 and 32, and preferably to the exclusion of the last pass 33 in the region of downflow boiler tubes. Superheated vapor entering through pipe 97 is conducted through inlet tubes 117 and 118 to inlet boxes or headers 119, thence through the respective U-tube bundles 116 to outlet boxes 120, and thence through outlet tubes 123 and 124 to outlet pipe 101. Each tube seat face 125 of junction boxes 119 and 120 is of hexagonal formation providing space for tubes 116 in three rows parallel to its longest straight margin 126, two rows having four tubes each and the third row, two tubes. Such a construction permits compact assembly of the inlet and outlet boxes 119 and 120 of each bundle, and enables the entire attemperator assembly to be positioned, as shown, so as to minimize obstruction to liquid flow to and from tubes connected to the drum. The provision of the non-radial push-out nozzles 112 for the inlet and outlet steam connections of the attemperator, when positioned at the bottom of the drum as shown, results in a clear space above the horizontally extending attemperator tube loops affording a working access to the lower ends of the boiler tubes. An access man-hole 111 of adequate size in the adjacent drum head is also an advantageous feature of the arrangement.

Figures 16, 17, 18, 19, 20, 21:
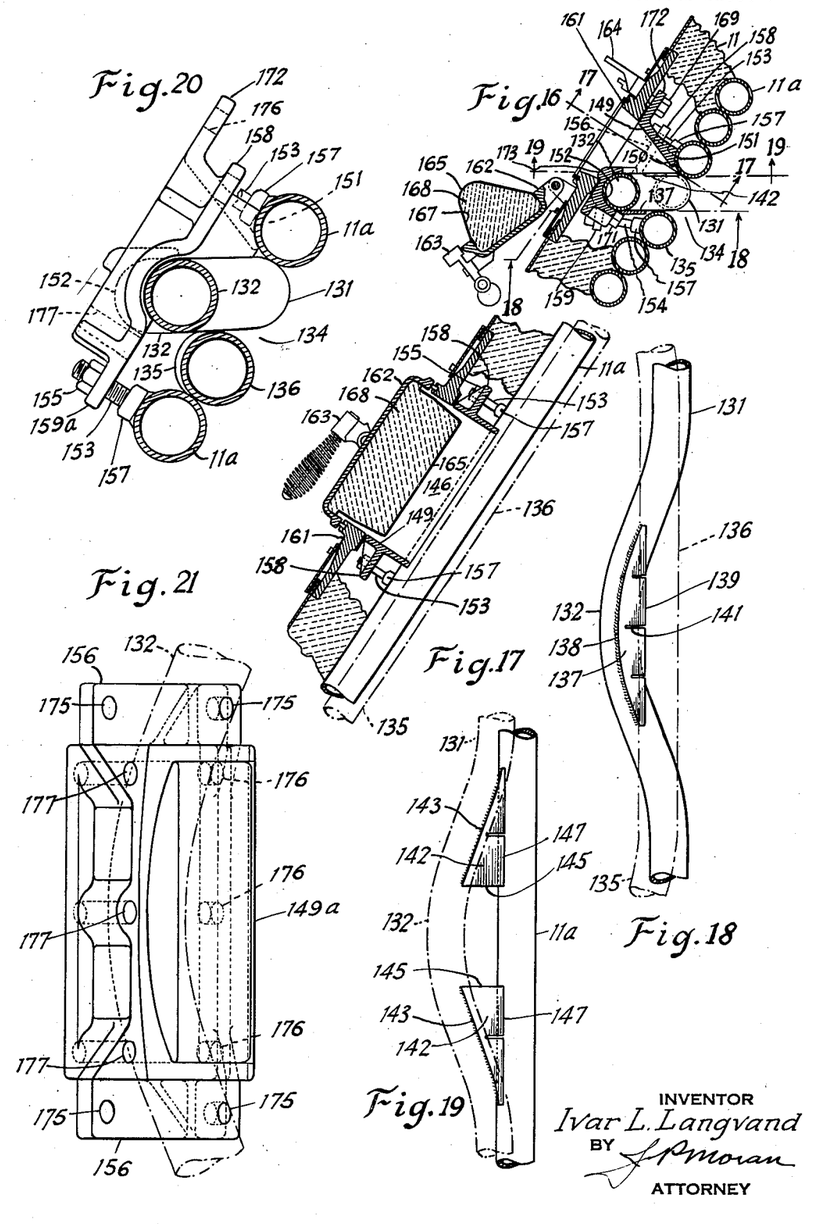
Fig. 16 is a fragmentary horizontal section, taken along line 16—16 of Fig. 1, showing details of the furnace wall construction.
Fig. 17 is a sectional side view related to Fig. 16, taken along line 16—16.
Figs. 18 and 19 are fragmentary views related to Fig. 16, taken along lines 18—18 and 19—19 respectively showing certain wall tube formations.
Fig. 20 is a fragmentary plan view, similar to Fig. 16, showing a modified construction.
Fig. 21 is a projected side view of Fig. 20 showing an element included therein.

In a furnace of the character described where openings are required in walls having closely spaced tubes, for inspection or lancing for example, the constructions shown in Figs. 16-21 may be employed to provide both the opening and a closure therefor. In detail, and referring first to Figs. 16-19, a lance door construction is shown in conjunction with contacting parallel tubes 11a associated with rear wall 11 of combustion chamber 16, the same general construction being applicable to other indicated locations in the same wall or in other walls of similar formation. Tube 131 has a portion of its length bent outwardly from the row of wall tubes 11a, as shown at 132 in Fig. 18, in a plane oblique to the plane of the row at an angle of from 55 to 60 degrees, for example, to provide the desired extent of wall opening 134. An adjoining tube 135 is similarly bent, although to a lesser degree, to provide a straight length portion 136 displaced inwardly from the row, as shown in Fig. 17, in a plane normal to the plane of the row, thereby defining the extent of intertube space required to accommodate the obliquely positioned bent tube portion 132, the displaced portion 136 of tube 135 being maintained parallel to tubes 11a for a sufficient distance to clear the bends in tube 131. For wall tubes of three inches outside diameter, as in the present embodiment, each tube bend is made on a centerline radius of eighteen inches to provide both the outwardly displaced tube portion 132 and the inwardly displaced tube portion 136.

A plate 137 shaped as in Fig. 18 is welded to tube 131 along the curved plate edge 138 to substantially close the gap between the bent-out portion 132 of tube 131 and the bent-in portion 136 of tube 135, plate 137 having a straight edge 139 formed with slots 141 therein for resilient engagement with the straight length tube portion 136. Plates 142 are welded to tube 131, at the opposite side from plate 137, along the curved plate edges 143, to close the gap between tube bend 132 and tube 11a at the opposite side of opening 134 from tube 135, the plates 142 having horizontal edges 145 longitudinally separated along tube 131 a distance equal to the effective height of opening 134 as determined by the height of the door frame opening 146. Each plate 142 is formed with a slotted straight edge 147 for resilient engagement with the associated wall tube 11a.

The closure unit for wall opening 134 includes an inner door frame casting 149 formed with a longitudinal projection 150 having a curved recess surface 151 conforming to and bearing against straight tube 11a at one side of the opening, the body portion of the frame having a curved recess surface 152 conforming to and bearing against the bent-out tube portion 132 at the opposite side of the opening. Inner frame 149 is secured to the wall by studs 153 and 154 extending through top and bottom flanges 156 and screwed into nuts 157 welded to wall tubes, each stud 153 extending through a flange portion 158 parallel to the tube row and engaging a nut welded to tube 11a adjacent the opening, and each stud 154 extending through a flange portion 159 inclined to the tube row at about twenty degrees and engaging a nut welded to the displaced portion 136 of tube 135, the assembly including nuts 155 attached to the outer ends of the studs.

The outer frame 161 and horizontally swinging door 162 are of the type disclosed in U. S. Patent 2,383,032, J. Abernethy, dated August 21, 1945, the door 162 having a latch 163 rotatable in a vertical plane and engaging catch 164 on the frame. In the specific form herein disclosed, door 162 is fitted with an insulating plug 165 of unsymmetrical cross section extending a considerable distance into and substantially filling the door frame opening 146 to protect the adjoining walls and door from furnace heat, the plug 165 comprising a sheet metal retainer 167 filled with suitable heat insulating material 168. The inner and outer door frames 149 and 161 are secured together by cap screws 169 and 171 along opposite sides, screws 169 at one side extending into outer frame 161 through side flanges 172 of inner frame 149, and screws 171 at the opposite side extending through a thicker body portion. Inner frame 149 includes an integral lug 173 extending into the outer frame opening closely adjacent a side wall thereof throughout the height of the opening.

It will be noted that the centerline of door frame opening 146 is laterally offset from the centerline of wall opening 134 toward the side occupied by wall tube 11a thereby rendering the described assembly particularly useful for lancing operations along an adjacent combustion chamber wall 14, for example, toward the side occupied by tube 135. For wall opening 174, for example, adjacent the opposite combustion chamber wall 13, the inner frame 149 and plug 165 are assembled in laterally reversed positions, with the positions of tubes 11a and 135 defining the opening correspondingly reversed.

Figs. 20 and 21 illustrate a modified construction wherein inner frame 149a is secured to straight tubes 11a at opposite sides of wall opening 134, thereby simplifying fabrication and assembly of the frame required. Tubes 131 and 135 are displaced from the row as before and similarly received in frame recesses 151 and 152. In this form, the flange portion 159a is in a plane with flange portion 158 parallel to the tube row, and studs 153 of equal lengths are inserted through holes 175 therein for securing the frame to straight tubes 11a at opposite sides of the wall opening, there being no attachment to the displaced portion 136 of tube 135. Cap screws 169 and 171 extend through holes 176 and 177 respectively for securing inner frame 149a to outer frame 161.

While in accordance with the provisions of the statutes I have illustrated and described herein the best forms of my invention now known to me, those skilled in the art will understand that changes may be made in the form of the apparatus disclosed without departing from the spirit of the invention covered by my claims, and that certain features of my invention may sometimes be used to advantage without a corresponding use of other features.

I claim:

1. In a boiler having front, rear and opposing side walls defining a setting of rectangular cross section, said boiler having a combustion chamber throughout the height of said setting and having a boiler tube space of less height than said chamber and laterally adjoining said chamber at elevations confined to the upper part of said setting, an upper drum and a lower drum adjacent the upper and lower boundaries of said space, a bank of upright tubes within said space extending between and connected to said drums, tubes connected to said upper drum and extending downwardly therefrom along opposing lower side wall portions of said combustion chamber at elevations below said lower drum, and downcomer means separately connecting said lower drum to the lower ends of said side wall tubes, a group of said side wall tubes having upper portions defining a partition separating said space from said combustion chamber, said partition extending rearwardly from said front wall and terminating short of said rear wall to provide a gas flow passage from said chamber into said space, another group of said side wall tubes having upper portions spaced apart across said gas flow passage, said side walls and associated tubes being arranged in downwardly converging relationship below the level of said lower drum to form a fluid cooled ash discharge hopper.

2. In a boiler having an upper drum and a lower drum, a bank of upright tubes connecting said drums, means defining a combustion chamber laterally adjoining the space containing said tubes, said chamber and space having a front and a rear wall in common, baffle means extending transversely of said tube bank space and arranged to direct gases from said chamber in successive passes transversely of said tubes, said chamber defining means including tubes connected to said upper drum and extending downwardly therefrom to elevations lower than said lower drum, said last named tubes having lower portions arranged in rows at center-to-center spacings substantially equal to their diameters and associated with opposing side wall boundaries of said combustion chamber extending from said front to said rear wall at said lower elevations, and downcomer means separately connecting one of said drums to the lower ends of tubes associated with the respective opposing walls, a group of said last named tubes in one wall having upper portions disposed in a row extending from said front wall at spacings corresponding to the spacings of said lower portions and forming a partition separating said tube bank space from the upper portion of said combustion chamber, said partition terminating short of said rear wall to provide communication between the upper portion of said combustion chamber and the first of said passes throughout a major portion of the height of the space between said drums, the remaining last named tubes in said one wall having upper portions spaced apart in rows across the entrance to said first gas pass, one of said side walls having a lower end portion inclined downwardly toward the opposing side wall to form a fluid cooled ash hopper bottom for said chamber.

IVAR L. LANGVAND.

REFERENCES CITED

The following references are of record in the file of this patent:

UNITED STATES PATENTS

| Number | Name | Date |
| --- | --- | --- |
| 323,882 | Pratt | Aug. 4, 1885 |
| 1,035,677 | Bascom | Aug. 13, 1912 |
| 1,119,318 | Rosenthal | Dec. 1, 1914 |
| 1,999,982 | Schmidt | Apr. 30, 1935 |
| 1,999,984 | Bailey et al. | Apr. 30, 1935 |
| 2,084,739 | Mayo | June 22, 1937 |
| 2,159,557 | Heller | May 23, 1939 |
| 2,186,919 | Bailey | Jan. 9, 1940 |
| 2,219,842 | Heller | Oct. 29, 1940 |
| 2,241,932 | Rehm | May 13, 1941 |
| 2,333,631 | Bailey et al. | Nov. 9, 1943 |
| 2,333,644 | Ebbets et al. | Nov. 9, 1943 |
| 2,343,895 | Frisch | Mar. 14, 1944 |
| 2,415,068 | Andrew | Feb. 4, 1947 |
| 2,429,976 | Bailey | Nov. 4, 1947 |

OTHER REFERENCES

B & W Publication, entitled "Central Station Boilers" of November 1938, pages 24 and 25, Fig. 25, and pages 48 and 49, Fig. 27.